US012578754B2

(12) United States Patent
Schumacher et al.

(10) Patent No.: US 12,578,754 B2
(45) Date of Patent: Mar. 17, 2026

(54) METHOD AND SYSTEM FOR RENDERING EVENT DATA FROM SUBSYSTEMS IN DIFFERENT CLOCK DOMAINS ACCORDING TO A SYSTEM-LEVEL TIMELINE

(71) Applicant: Xilinx, Inc., San Jose, CA (US)

(72) Inventors: Paul R Schumacher, Longmont, CO (US); Anurag Dubey, Longmont, CO (US); Roger Ng, San Jose, CA (US)

(73) Assignee: XILINX, INC., San Jose, CA (US)

( * ) Notice: Subject to any disclaimer, the term of this patent is extended or adjusted under 35 U.S.C. 154(b) by 68 days.

(21) Appl. No.: 18/544,927

(22) Filed: Dec. 19, 2023

(65) Prior Publication Data

US 2025/0199568 A1     Jun. 19, 2025

(51) Int. Cl.
*G06F 1/14*          (2006.01)

(52) U.S. Cl.
CPC ..................................... *G06F 1/14* (2013.01)

(58) Field of Classification Search
CPC ....................................................... G06F 1/14
See application file for complete search history.

(56) References Cited

U.S. PATENT DOCUMENTS

| | | | |
|---|---|---|---|
| 7,784,005 B1 | 8/2010 | Ng | |
| 8,640,064 B1 | 1/2014 | Liddell et al. | |
| 9,058,135 B1 * | 6/2015 | Schumacher | ............ G06F 1/10 |
| 10,642,811 B1 | 5/2020 | Liddell et al. | |

| | | | |
|---|---|---|---|
| 10,673,439 B1 | 6/2020 | Ahmad et al. | |
| 10,740,210 B1 | 8/2020 | Schumacher et al. | |
| 10,762,263 B1 | 9/2020 | Ng et al. | |
| 11,042,564 B1 | 6/2021 | Liddell et al. | |
| 11,144,687 B1 | 10/2021 | Chandraiah et al. | |
| 11,288,222 B1 | 3/2022 | Noguera Serra et al. | |
| 2009/0052431 A1 | 2/2009 | Kroener et al. | |
| 2009/0158075 A1 * | 6/2009 | Biberstein | ................. G06F 1/14 |
| | | | 713/375 |
| 2013/0297960 A1 * | 11/2013 | Quinton | .................. G06F 11/26 |
| | | | 713/400 |
| 2014/0096146 A1 * | 4/2014 | Maor | .................. G06F 11/3452 |
| | | | 719/318 |
| 2015/0006969 A1 * | 1/2015 | Hanssen | ............. G06F 11/3476 |
| | | | 714/45 |
| 2015/0046617 A1 * | 2/2015 | Shirlen | ............... G06F 11/3466 |
| | | | 710/117 |
| 2017/0041357 A1 * | 2/2017 | Wang | .................... H04L 65/403 |

(Continued)

FOREIGN PATENT DOCUMENTS

| | | | | |
|---|---|---|---|---|
| CA | 2999773 A1 * | 4/2017 | ............. | G04G 21/02 |

*Primary Examiner* — Phil K Nguyen
(74) *Attorney, Agent, or Firm* — Patterson + Sheridan, LLP

(57)          ABSTRACT

Disclosed approaches for rendering event data from subsystems in different clock domains according to a system-level timeline include, for each of multiple subsystems, sampling a system timer in a first clock domain for a first timestamp by a host processor. A host processor requests a subsystem timestamp from a subsystem timer in each of the subsystems. The subsystem timestamp is associated with the first timestamp, and the subsystem timer operates in a clock domain different from the first clock domain. The host processor translates timestamps in traced event data of the subsystems to a timeline of the system timer using the first timestamp and associated subsystem timestamps.

18 Claims, 10 Drawing Sheets

100

DPE Array
102

120

Network-on-Chip (NoC) 108

120 Hardwired Circuit Block(s) 110

Hardwired Circuit Block(s) 110

120

Programmable Logic (PL) 104

Programmable Logic (PL) 104

Processor System (PS) 106

120

120

120

120

Hardwired Circuit Block(s) 110

120

120 Hardwired Circuit Block(s) 110

120 Hardwired Circuit Block(s) 110

(56) References Cited

U.S. PATENT DOCUMENTS

| | | | | |
|---|---|---|---|---|
| 2017/0091063 | A1* | 3/2017 | Schulz | G06F 11/348 |
| 2018/0034749 | A1* | 2/2018 | Shirlen | H04L 69/28 |
| 2024/0427372 | A1* | 12/2024 | Gillen | G01S 13/867 |

* cited by examiner

METHOD AND SYSTEM FOR RENDERING EVENT DATA FROM SUBSYSTEMS IN DIFFERENT CLOCK DOMAINS ACCORDING TO A SYSTEM-LEVEL TIMELINE

TECHNICAL FIELD

The disclosure generally relates to capturing timestamped events in different clock domains and presenting a visualization of the events according to a system-level timeline.

BACKGROUND

Complex system-on-chip (SoC) devices have been developed to satisfy the processing needs of artificial intelligence (AI), edge, network, and cloud applications. Different SoC devices can include various combinations of programmable logic, graphics processing units (GPUs), advanced reduced instruction set (RISC) microprocessor cores, artificial intelligence (AI) cores, central processing units (CPUs), on-chip memory and memory controllers, network interfaces, peripheral interfaces, etc. To maximize performance, the components of an application may be distributed across multiple subsystems of the SoC device.

The development of such applications inevitably involves debugging activities, which are supported by debugging tools. One such debugging tool is an event viewer that depicts occurrences of events on a timeline. Debugging an SoC application may be complicated by the fact that the subsystems of an SoC are often in separate clock domains. The separate clock domains make the evaluation of the relative timing of events occurring in different subsystems difficult.

SUMMARY

A disclosed method includes sampling, for each subsystem of a plurality of subsystems, a system timer in a first clock domain for a first timestamp by a host processor. For each subsystem, the host processor requests a subsystem timestamp from a subsystem timer in the subsystem. The subsystem timestamp is associated with the first timestamp, and the subsystem timer operates in a clock domain different from the first clock domain. For each subsystem, the host processor translates timestamps in traced event data of the subsystem to a timeline of the system timer using the first timestamp and associated subsystem timestamp.

A disclosed system includes one or more computer processors configured to execute program code and a memory arrangement coupled to the one or more computer processors. The memory arrangement is configured with instructions of a debugging tool that when executed by the one or more computer processors cause the one or more computer processors to perform operations for each subsystem of a plurality of subsystems. The operations include sampling a system timer in a first clock domain for a first timestamp. The operations include requesting a subsystem timestamp from a subsystem timer in the subsystem. The subsystem timestamp is associated with the first timestamp, and the subsystem timer operates in a clock domain different from the first clock domain. The operations include translating timestamps in traced event data of the subsystem to a timeline of the system timer using the first timestamp and associated subsystem timestamp.

Other features will be recognized from consideration of the Detailed Description and Claims, which follow.

BRIEF DESCRIPTION OF THE DRAWINGS

Various aspects and features of the methods and systems will become apparent upon review of the following detailed description and upon reference to the drawings in which.

DETAILED DESCRIPTION

Figure 1:
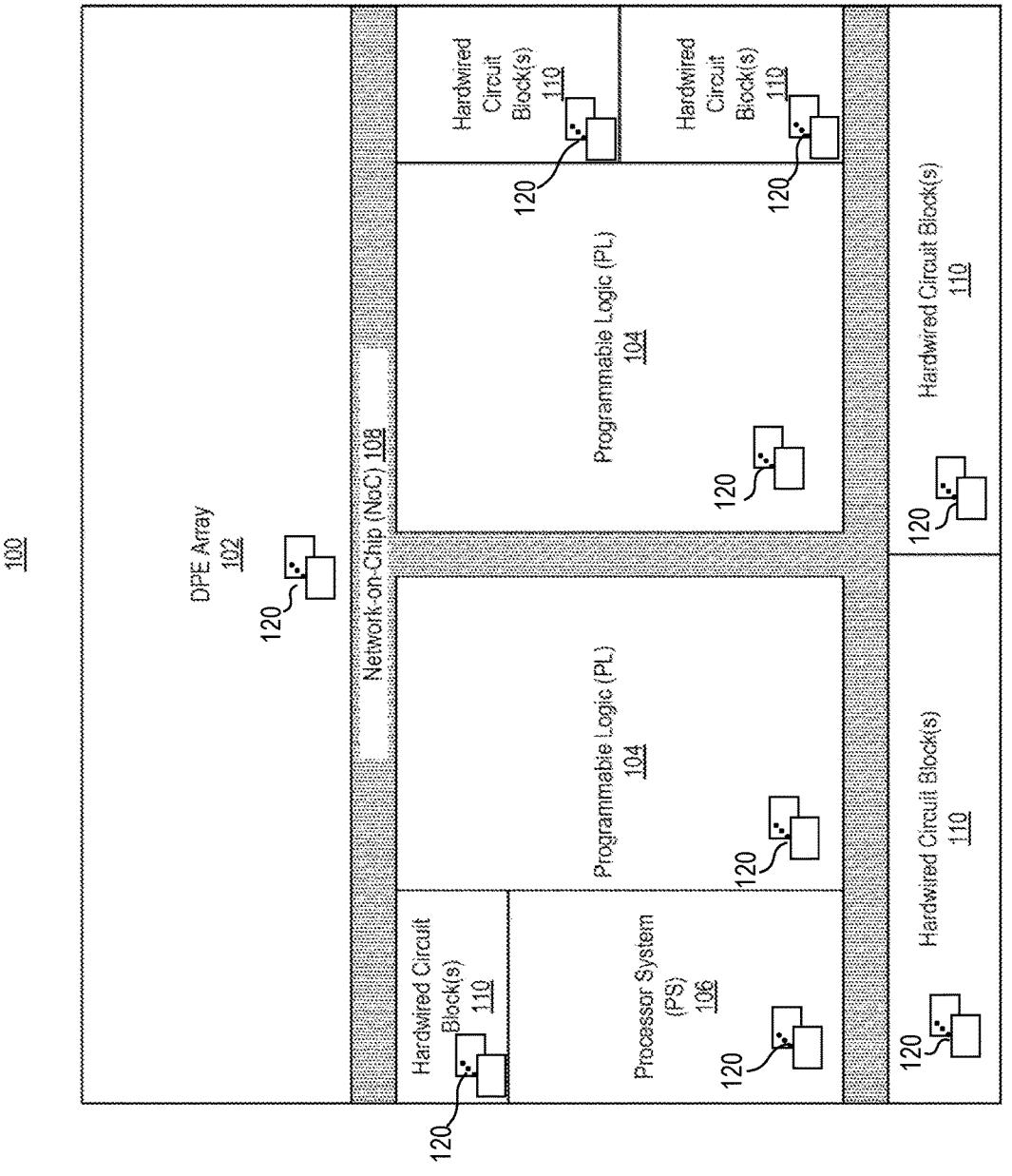
FIG. 1 illustrates an exemplary architecture for a System-on-Chip (SoC) having a number of subsystems that can trace events that are timestamped by local timer circuits.

In the following description, numerous specific details are set forth to describe specific examples presented herein. It should be apparent, however, to one skilled in the art, that one or more other examples and/or variations of these examples, all of which are non-limiting, may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed approaches significantly reduce message traffic resulting found in prior approaches to synchronizing timers across clock domains. According to a prior approach, a processing device in a first clock domain sends a first timer value from the first clock domain to a processing device in a second clock domain, and the processing device in the second clock domain reads a first timer value from a timer in the second clock domain. The processing device in the second clock domain stores the first timer values as a pair, and sends a response message to the processing device in the first clock domain. In response to the message received from the processing device in the second clock domain, the processing device in the first clock domain reads the timer in the first clock domain and sends a second timer value to the processing device in the second clock domain. In response to receiving the second timer value, the processing device in the second clock domain reads a second timer value from the timer in the second clock domain and stores the second timer values as a pair. Thus, the prior approach involves communicating three messages between the first processing device and the second processing device. In systems having a significant number of subsystems, such as a system having an array of data processing engines and many supporting subsystems, the message traffic can degrade performance.

The disclosed methods and systems trace timestamped events across a heterogeneous hardware system and process the traced event data for rendering on a system-level timeline. Each subsystem traces events using a local timer, and timestamps of the events are translated to a system-level timeline. The time, x, of each subsystem timestamp can be converted to a system-level time (y) as y=mx+b, where the slope m is the ratio of the system-level clock frequency to the subsystem clock frequency, and b is an offset from a system-level base time.

According to the disclosed approaches, a system-level processor reads a timer value from a timer in its clock domain, and sends a request to a subsystem to read a timer value from a timer in the clock domain of the subsystem. The subsystem sends the timer value to the system-level processor. According to one approach, if the amount of delay (referred to herein as the "system-subsystem delay") is known for sending a message from the system-level processor to the subsystem, the system-level processor can store the timer values for subsequent use in determining offset values. According to another approach, if the system-subsystem delay is not known for sending a message from the system-level processor to the subsystem, in response to receiving the timer value from the subsystem, the system-level processor can read a second timer value from the timer in its clock domain. The system-level processor can then store the three timer values for subsequent use in determining the offset values.

In other aspects, the disclosed approaches avoid interrupting the tracing of events to resynchronize timestamps of subsystems to a system-level timeline. Also, the methods and systems merge the traced event data in O(n) time from numerous subsystems into a data file having the event data ordered according to the system-level timeline, allowing display on a system-level timeline.

FIG. 1 illustrates an exemplary architecture for a System-on-Chip (SoC) 100 having a number of subsystems that can trace events that are timestamped by local timer circuits. Though the examples shown and described involve a particular SoC and its subsystem, it will be recognized that the disclosed approaches can be applied to any system in which event data is traced by subsystem circuitry operating in different clock domains. SoC 100 is an example of a programmable IC and an integrated programmable device platform. In the example of FIG. 1, the various, different subsystems or regions of the SoC 100 illustrated may be implemented on a single die provided within a single integrated package. In other examples, the different subsystems may be implemented on a plurality of interconnected dies provided as a single, integrated package.

In the example, the SoC 100 includes a plurality of regions having circuitry with different functionalities. In the example, the SoC 100 optionally includes a data processing engine (DPE) array 102. SoC 100 includes programmable logic (PL) regions 104 (hereafter PL region(s) or PL), a processing system (PS) 106, a Network-on-Chip (NoC) 108, and one or more hardwired circuit blocks 110. DPE array 102 is implemented as a plurality of interconnected, hardwired, and programmable processors having an interface to the other regions of the SoC 100.

The different subsystems of the SoC 100 can each have one or more separate timers that count cycles of the clock signals in the subsystems. The timers can be called upon to output timestamps, such as when the subsystems are configured with debug/trace instrumentation to capture event data. The clock domains in which the timers operate depend on the user configuration of the SoC, and therefore, can operate at different frequencies. The timers in the subsystems are shown by blocks 120.

As an example, each DPE in the DPE array 102 can include a timer circuit and a control, debug, and trace (CDT) circuit, together illustrated as block 120. The timer circuit is capable of providing a signal that is used by the CDT circuit for timestamping traced events. The CDT provides and interface through which the timer circuit can be sampled. Examples of traceable DPE events include events that indicate when kernel functions are being invoked and returned, events that indicate when a core stalls (such as by having no data at an input or backpressure on an output), and events that indicate stalls due memory conflicts.

PL 104 is circuitry that may be programmed to perform specified functions. As an example, PL 104 may be implemented as field programmable gate array type of circuitry. PL 104 can include an array of programmable circuit blocks. Examples of programmable circuit blocks within PL 104 include, but are not limited to, configurable logic blocks (CLBs), dedicated random access memory blocks (BRAM and/or UltraRAM or URAM), digital signal processing blocks (DSPs), clock managers, and/or delay lock loops (DLLs).

Each programmable circuit block within PL 104 typically includes both programmable interconnect circuitry and programmable logic circuitry. The programmable interconnect circuitry typically includes a large number of interconnect wires of varying lengths interconnected by programmable interconnect points (PIPs). Typically, the interconnect wires are configured (e.g., on a per wire basis) to provide connectivity on a per-bit basis (e.g., where each wire conveys a single bit of information). The programmable logic circuitry implements the logic of a user design using programmable elements that may include, for example, look-up tables, registers, arithmetic logic, and so forth. The programmable interconnect and programmable logic circuitries may be programmed by loading configuration data into internal configuration memory cells that define how the programmable elements are configured and operate.

The PS 106 is implemented as hardwired circuitry that is fabricated as part of the SoC 100. The PS 106 may be implemented as, or include, any of a variety of different processor types each capable of executing program code. For example, PS 106 may be implemented as an individual processor, e.g., a single core capable of executing program code. In another example, PS 106 may be implemented as a multi-core processor. In still another example, PS 106 may include one or more cores, modules, co-processors, interfaces, and/or other resources. PS 106 may be implemented using any of a variety of different types of architectures. Example architectures that may be used to implement PS 106 may include, but are not limited to, an ARM processor architecture, an x86 processor architecture, a GPU architecture, a mobile processor architecture, a DSP architecture, or other suitable architecture that is capable of executing computer-readable instructions or program code.

NoC 108 includes an interconnecting network for sharing data between endpoint circuits in SoC 100. The endpoint circuits can be disposed in DPE array 102, PL regions 104, PS 106, and/or in hardwired circuit blocks 110-118. NoC 108 can include high-speed data paths with dedicated switching. In an example, NoC 108 includes horizontal paths, vertical paths, or both horizontal and vertical paths. The arrangement and number of regions shown in FIG. 1 is merely an example. The NoC 108 is an example of the common infrastructure that is available within the SoC 100 to connect selected components and/or subsystems.

The hardwired circuit blocks 110 may include input/output (I/O) blocks, and/or transceivers for sending and receiving signals to circuits and/or systems external to SoC 100, memory controllers, or the like. Examples of different I/O blocks may include single-ended and pseudo differential I/Os and high-speed differentially clocked transceivers. Further, the hardwired circuit blocks 110 may be implemented to perform specific functions. Examples of hardwired circuit blocks 110 include, but are not limited to, cryptographic engines, digital-to-analog converters, analog-to-digital converters, and the like. The hardwired circuit blocks 110 within the SoC 100 may be referred to herein from time-to-time as application-specific blocks.

In other example implementations, the SoC 100 may include two or more DPE arrays 102 located in different regions of the IC. In still other examples, the SoC 100 may be implemented as a multi-die IC. In that case, each subsystem may be implemented on a different die. The different dies may be communicatively linked using any of a variety of available multi-die IC technologies such stacking the dies side-by-side on an interposer, using a stacked-die architecture where the IC is implemented as a Multi-Chip Module (MCM), or the like. In the multi-die IC example, it should be appreciated that each die may include single subsystem, two or more subsystems, a subsystem and another partial subsystem, or any combination thereof.

Figure 2:
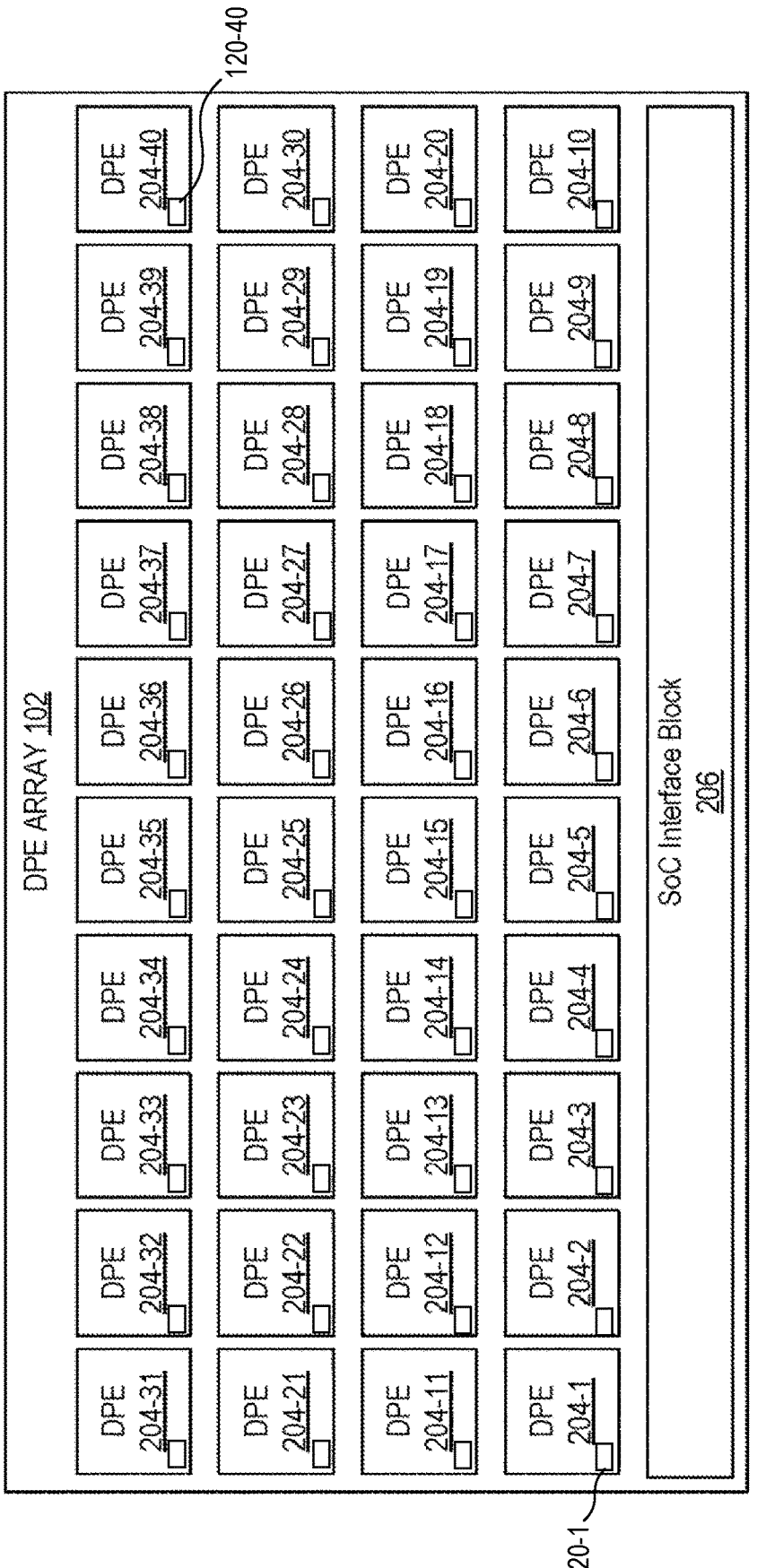
FIG. 2 illustrates an example implementation of a data processing engine (DPE) array.

FIG. 2 illustrates an example implementation of DPE array 102. In the example of FIG. 2, DPE array 102 is implemented as a two-dimensional array of DPEs 204 that includes SoC interface block 206. DPE array 102 may be implemented using any of a variety of different architectures to be described herein in greater detail below. For purposes of illustration and not limitation, FIG. 2 illustrates DPEs 204 arranged in aligned rows and aligned columns. In other embodiments, however, DPEs 204 may be arranged where DPEs in selected rows and/or columns are horizontally inverted or flipped relative to DPEs in adjacent rows and/or columns. In one or more other embodiments, rows and/or columns of DPEs may be offset relative to adjacent rows and/or columns. One or more or all DPEs 204 may be implemented to include a one or more cores each capable of executing program code. The number of DPEs 204, particular arrangement of DPEs 204, and/or orientation of DPEs 204 is not intended to be limiting.

Each DPE has a timer circuit (or "timer" for brevity), which is shown as a small block within the DPE block. For example, DPE 204-1 includes timer 120-1, and DPE 204-40 includes timer 120-40.

SoC interface block 206 is capable of coupling DPEs 204 to one or more other subsystems of device IC 200. In one or more embodiments, SoC interface block 206 is coupled to adjacent DPEs 204. For example, SoC interface block 206 may be directly coupled to each DPE 204 in the bottom row of DPEs in DPE array 202. In illustration, SoC interface block 206 may be directly connected to DPE 204-1, 204-2, 204-3, 204-4, 204-5, 204-6, 204-7, 204-8, 204-9, and 204-10.

DPEs 204 are interconnected by DPE interconnects (not shown), which, when taken collectively, form a DPE interconnect network. As such, SoC interface block 206 is capable of communicating with any DPE 204 of DPE array 102 by communicating with one or more selected DPEs 204 of DPE array 102 directly connected to SoC interface block 206 and utilizing the DPE interconnect network formed of DPE interconnects implemented within each respective DPE 204.

SoC interface block 206 is capable of coupling each DPE 204 within DPE array 102 with one or more other subsystems of SoC 100. For example, SoC interface block 206 is capable of coupling to DPE array 102 to the NoC 108 and PL 104. As such, the DPE array 102 is capable of communicating with circuit blocks implemented in PL 104, the PS 106, and/or any of the hardwired circuit blocks 110. For example, SoC interface block 206 is capable of establishing connections between selected DPEs 204 and PL 104. SoC interface block 206 is also capable of establishing connections between selected DPEs 204 and NoC 108. Through NoC 108, the selected DPEs 204 are capable of communicating with PS 106 and/or hardwired circuit blocks 110. Selected DPEs 204 are capable of communicating with hardwired circuit blocks 110 via SoC interface block 206 and PL 104. In particular embodiments, SoC interface block 206 may be coupled directly to one or more subsystems of SoC 100. For example, SoC interface block 206 may be coupled directly to PS 106 and/or to other hardwired circuit blocks 110. In particular embodiments, hardwired circuit blocks 110 may be considered examples of ASICs.

In one or more embodiments, DPE array 102 includes a single clock domain. Other subsystems such as NoC 108, PL 104, PS 106, and the various hardwired circuit blocks 110 may be in one or more separate or different clock domain(s). Still, DPE array 102 may include additional clocks that may be used for interfacing with other ones of the subsystems. In particular embodiments, SoC interface block 206 includes a clock signal generator that is capable of generating one or more clock signals that may be provided or distributed to DPEs 204 of DPE array 102.

DPE array 102 may be programmed by loading configuration data into internal configuration memory cells (also referred to herein as "configuration registers") that define connectivity among DPEs 204 and SoC interface block 206 and how DPEs 204 and SoC interface block 206 operate. For example, for a particular DPE 204 or group of DPEs 204 to communicate with a subsystem, the DPE(s) 204 and SoC interface block 206 are programmed to do so. Similarly, for one or more particular DPEs 204 to communicate with one or more other DPEs 204, the DPEs are programmed to do so. DPE(s) 204 and SoC interface block 206 may be programmed by loading configuration data into configuration registers within DPE(s) 204 and SoC interface block 206, respectively. In another example, the clock signal generator, being part of SoC interface block 206, may be programmable using configuration data to vary the clock frequencies provided to DPE array 102.

Figure 3:
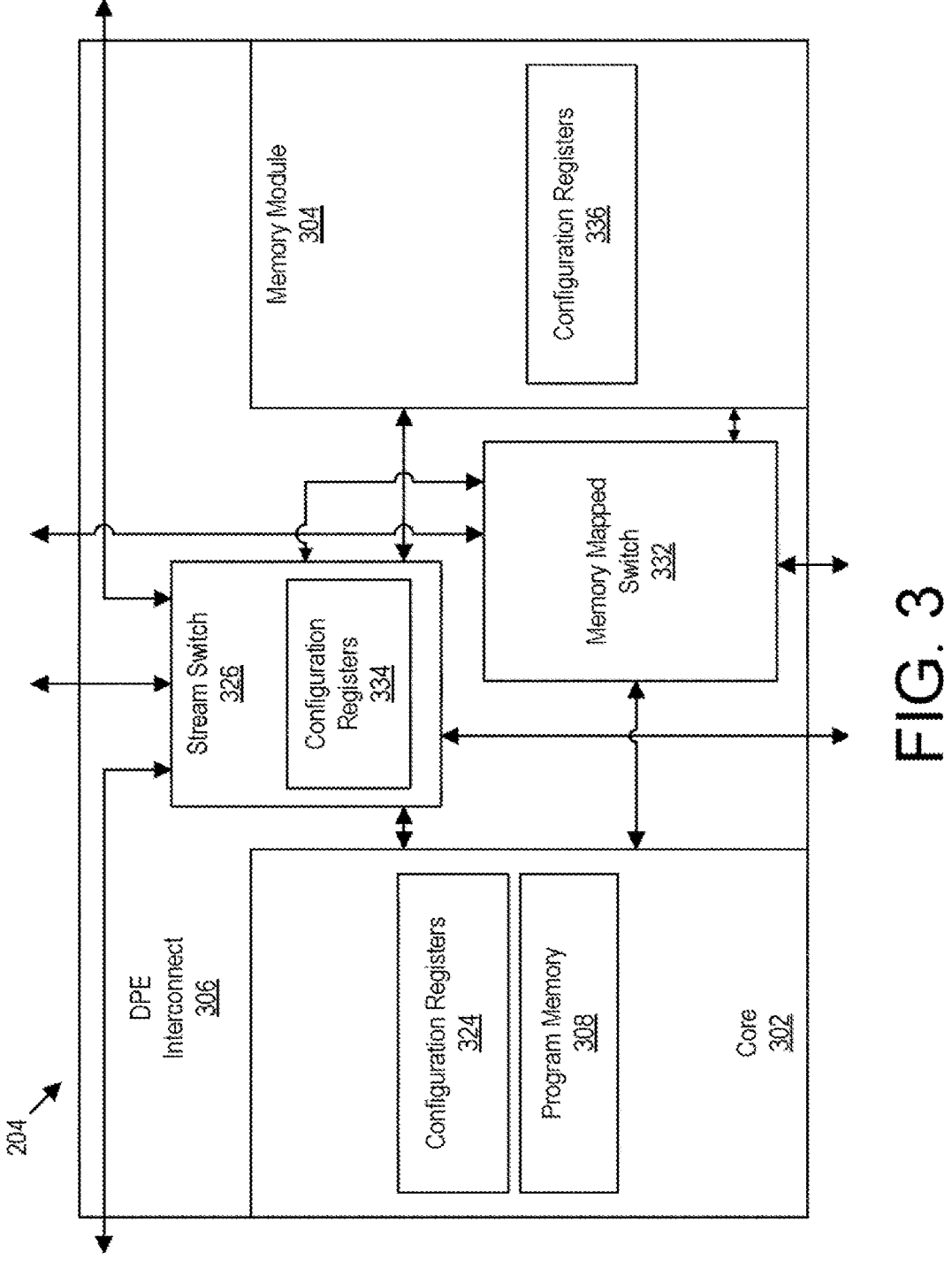
FIG. 3 illustrates an example architecture for a DPE.

FIG. 3 illustrates an example architecture for a DPE 204 of DPE array 102 of FIG. 2. In the example of FIG. 3, DPE 204 includes a core 302, a memory module 304, and DPE interconnect 306. Each DPE 204 is implemented as a hardwired and programmable circuit block on the SoC 100.

Core 302 provides the data processing capabilities of DPE 204. Core 302 may be implemented as any of a variety of different processing circuits. In the example of FIG. 3, core 302 includes an optional program memory 308. In an example implementation, core 302 is implemented as a processor that is capable of executing program code, e.g., computer readable instructions. In that case, program memory 308 is included and is capable of storing instructions that are executed by core 302. Core 302, for example, may be implemented as a CPU, a GPU, a DSP, a vector processor, or other type of processor that is capable of executing instructions. Core 302 may be implemented using any of the various CPU and/or processor architectures described herein. In another example, core 302 is implemented as a very long instruction word (VLIW) vector processor or DSP.

In particular implementations, program memory 308 is implemented as a dedicated program memory that is private to core 302 (e.g., accessed exclusively by core 302). Program memory 308 may only be used by the core of the same DPE 204. Thus, program memory 308 may only be accessed by core 302 and is not shared with any other DPE or component of another DPE. Program memory 308 may include a single port for read and write operations. Program memory 308 may support program compression and is addressable using the memory mapped network portion of DPE interconnect 306 described in greater detail below. Via the memory mapped network of DPE interconnect 306, for example, program memory 308 may be loaded with program code that may be executed by core 302.

Core 302 may include configuration registers 324. Configuration registers 324 may be loaded with configuration data to control operation of core 302. In one or more embodiments, core 302 may be activated and/or deactivated based upon configuration data loaded into configuration registers 324. In the example of FIG. 3, configuration registers 324 are addressable (e.g., may be read and/or written) via the memory mapped network of DPE interconnect 306 described in greater detail below.

In one or more embodiments, memory module 304 is capable of storing data that is used by and/or generated by core 302. For example, memory module 304 is capable of storing application data. Memory module 304 may include a read/write memory such as a random-access memory (RAM). Accordingly, memory module 304 is capable of storing data that may be read and consumed by core 302. Memory module 304 is also capable of storing data (e.g., results) that are written by core 302.

In one or more other embodiments, memory module 304 is capable of storing data, e.g., application data that may be used by and/or generated by one or more other cores of other DPEs within the DPE array. One or more other cores of other DPEs may also read from and/or write to memory module 304. In particular embodiments, the other cores that may read from and/or write to memory module 304 may be cores of one or more neighboring DPEs. Another DPE that shares a border or boundary with DPE 204 (e.g., that is adjacent) is said to be a "neighboring" DPE relative to DPE 204. By allowing core 302 and one or more other cores from neighboring DPEs to read and/or write to memory module 304, memory module 304 implements a shared memory that supports communication among the different DPEs and/or cores capable of accessing memory module 304.

Referring to FIG. 2, for example, DPEs 204-14, 204-16, 204-5, and 204-25 are considered neighboring DPEs of DPE 204-15. In one example, the core within each of DPEs 204-16, 204-5, and 204-25 is capable of reading and writing to the memory module within DPE 204-15. In particular embodiments, only those neighboring DPEs that are adjacent to the memory module may access the memory module of DPE 204-15. For example, DPE 204-14, while adjacent to DPE 204-15, may not be adjacent to the memory module of DPE 204-15 since the core of DPE 204-15 may be located between the core of DPE 204-14 and the memory module of DPE 204-15. As such, in particular embodiments, the core of DPE 204-14 may not access the memory module of DPE 204-15.

In particular embodiments, whether a core of a DPE is able to access the memory module of another DPE depends upon the number of memory interfaces included in the memory module and whether such cores are connected to an available one of the memory interfaces of the memory module. In the example above, the memory module of DPE 204-15 includes four memory interfaces, where the core of each of DPEs 204-16, 204-5, and 204-25 is connected to such a memory interface. Core 302 within DPE 204-15 itself is connected to the fourth memory interface. Each memory interface may include one or more read and/or write channels. In particular embodiments, each memory interface includes multiple read channels and multiple write channels so that the particular core attached thereto is capable of reading and/or writing to multiple banks within memory module 304 concurrently.

In other examples, more than four memory interfaces may be available. Such other memory interfaces may be used to allow DPEs on a diagonal to DPE 204-15 to access the memory module of DPE 204-15. For example, if the cores in DPEs such as DPEs 204-14, 204-24, 204-26, 204-4, and/or 204-6 are also coupled to an available memory interface of the memory module in DPE 204-15, such other DPEs would also be capable of accessing the memory module of DPE 204-15.

Memory module 304 may include configuration registers 336. Configuration registers 336 may be loaded with configuration data to control operation of memory module 304. In the example of FIG. 3, configuration registers 336 (and 324) are addressable (e.g., may be read and/or written) via the memory mapped network of DPE interconnect 306 described in greater detail below.

In the example of FIG. 3, DPE interconnect 306 is specific to DPE 204. DPE interconnect 306 facilitates various operations including communication between DPE 204 and one or more other DPEs of DPE array 102 and/or communication with other subsystems of the SoC 100. DPE interconnect 306 further enables configuration, control, and debugging of DPE 204.

In particular embodiments, DPE interconnect 306 is implemented as an on-chip interconnect. An example of an on-chip interconnect is an Advanced Microcontroller Bus Architecture (AMBA) eXtensible Interface (AXI) bus (e.g., or switch). An AMBA AXI bus is an embedded microcontroller bus interface for use in establishing on-chip connections between circuit blocks and/or systems. An AXI bus is provided herein as an example of interconnect circuitry that may be used with the inventive arrangements described within this disclosure and, as such, is not intended as a limitation. Other examples of interconnect circuitry may include other types of buses, crossbars, and/or other types of switches.

In one or more embodiments, DPE interconnect 306 includes two different networks. The first network is capable of exchanging data with other DPEs of DPE array 102 and/or other subsystems of the SoC 100. For example, the first network is capable of exchanging application data. The second network is capable of exchanging data such as configuration, control, and/or debugging data for the DPE(s).

In the example of FIG. 3, the first network of DPE interconnect 306 is formed of stream switch 326 and one or more stream interfaces (not shown). For example, stream switch 326 includes a stream interface for connecting to each of core 302, memory module 304, memory mapped switch 332, a DPE above, a DPE to the left, a DPE to the right, and a DPE below. Each stream interface may include one or more masters and one or more slaves.

Stream switch 326 is capable of allowing non-neighboring DPEs and/or DPEs that are not coupled to a memory interface of memory module 304 to communicate with core 302 and/or memory module 304 via the DPE interconnect network formed by the DPE interconnects of the respective DPEs 204 of DPE array 102.

Referring again to FIG. 2 and using DPE 204-15 as a point of reference, stream switch 326 is coupled to, and capable of, communicating with another stream switch located in the DPE interconnect of DPE 204-14. Stream switch 326 is coupled to, and capable of, communicating with another stream switch located in the DPE interconnect of DPE 204-25. Stream switch 326 is coupled to, and capable of, communicating with another stream switch located in the DPE interconnect of DPE 204-16. Stream switch 326 is coupled to, and capable of, communicating with another stream switch located in the DPE interconnect of DPE 204-5. As such, core 302 and/or memory module 304 are also capable of communicating with any of the DPEs within DPE array 102 via the DPE interconnects in the DPEs.

Stream switch 326 may also be used to interface to subsystems such as PL 104 and/or NoC 108. In general, stream switch 326 is programmed to operate as a circuit-switching stream interconnect or a packet-switched stream interconnect. A circuit-switching stream interconnect is capable of implementing point-to-point, dedicated streams that are suitable for high-bandwidth communication among DPEs. A packet-switching stream interconnect allows streams to be shared to time-multiplex multiple logical streams onto one physical stream for medium bandwidth communication.

Stream switch 326 may include configuration registers (abbreviated as "CR" in FIG. 3) 334. Configuration data may be written to configuration registers 334 by way of the memory mapped network of DPE interconnect 306. The configuration data loaded into configuration registers 334 dictates which other DPEs and/or subsystems (e.g., NoC 108, PL 104, and/or PS 106) DPE 204 will communicate with and whether such communications are established as circuit-switched point-to-point connections or as packet-switched connections.

The second network of DPE interconnect 306 is formed of memory mapped switch 332. Memory mapped switch 332 includes a plurality of memory mapped interfaces (not shown). Each memory mapped interface may include one or more masters and one or more slaves. For example, memory mapped switch 332 includes a memory mapped interface for connecting to each of core 302, memory module 304, the memory mapped switch in the DPE above DPE 204, and the memory mapped switch in the DPE below DPE 204.

Memory mapped switch 332 is used to convey configuration, control, and debugging data for DPE 204. In the example of FIG. 3, memory mapped switch 332 is capable of receiving configuration data that is used to configure DPE 204. Memory mapped switch 332 may receive configuration data from a DPE located below of DPE 204 and/or from SoC interface block 206. Memory mapped switch 332 is capable of forwarding received configuration data to one or more other DPEs above DPE 204, to core 302 (e.g., to program memory 308 and/or to configuration registers 324), to memory module 304 (e.g., to memory within memory module 304 and/or to configuration registers 336), and/or to configuration registers 334 within stream switch 326.

DPE interconnect 306 is coupled to the DPE interconnect of each neighboring DPE and/or SoC interface block 206 depending upon the location of DPE 204. Taken collectively, DPE interconnects of DPEs 204 form a DPE interconnect network (which may include the stream network and/or the memory mapped network). The configuration registers of the stream switches of each DPE may be programmed by loading configuration data through the memory mapped switches. Through configuration, the stream switches and/or stream interfaces are programmed to establish connections, whether packet-switched or circuit-switched, with other endpoints, whether in one or more other DPEs 204 and/or in SoC interface block 206.

In one or more embodiments, DPE array 102 is mapped to the address space of a processor system such as PS 106. Accordingly, any configuration registers and/or memories within DPE 204 may be accessed via a memory mapped interface. For example, memory in memory module 304, program memory 308, configuration registers 324 in core 302, configuration registers 336 in memory module 304, and/or configuration registers 334 may be read and/or written via memory mapped switch 332.

In the example of FIG. 3, memory mapped interfaces are capable of receiving configuration data for DPE 204. The configuration data may include program code that is loaded into program memory 308 (if included), configuration data for loading into configuration registers 324, 334, and/or 336, and/or data to be loaded into memory (e.g., memory banks) of memory module 304. In the example of FIG. 3, configuration registers 324, 334, and 336 are shown as being located within the particular circuit structures that the configuration registers are intended to control, e.g., core 302, stream switch 326, and memory module 304. The example of FIG. 3 is for purposes of illustration only and illustrates that elements within core 302, memory module 304, and/or stream switch 326 may be programmed by way of loading configuration data into the corresponding configuration registers. In other embodiments, the configuration registers may be consolidated within a particular region of DPE 204 despite controlling operation of components distributed throughout DPE 204.

Accordingly, stream switch 326 may be programmed by loading configuration data into configuration registers 334. The configuration data programs stream switch 326 to operate in a circuit-switching mode between two different DPEs and/or other subsystems or in a packet-switching mode between selected DPEs and/or other subsystems. Thus, connections established by stream switch 326 to other stream interfaces and/or switches are programmed by loading suitable configuration data into configuration registers 334 to establish actual connections or application data paths within DPE 204, with other DPEs, and/or with other subsystems of IC 300.

According to an exemplary approach, events on M DPEs of an array are traced using N trace ports, where N<M. The trace ports can be implemented by circuitry in the SoC Interface Block 206 (FIG. 2). A series of stream switches 326 merge the traced event data from the M DPEs. Each trace port writes the traced event data to a specified portion of on-device/SoC memory. The traced event data written by a trace port can have packets from many different DPEs, which are merged in timestamp order on a packet level (i.e., packet from tile (x1,y1), then packet from tile (x2,y2), etc.).

Figure 4:
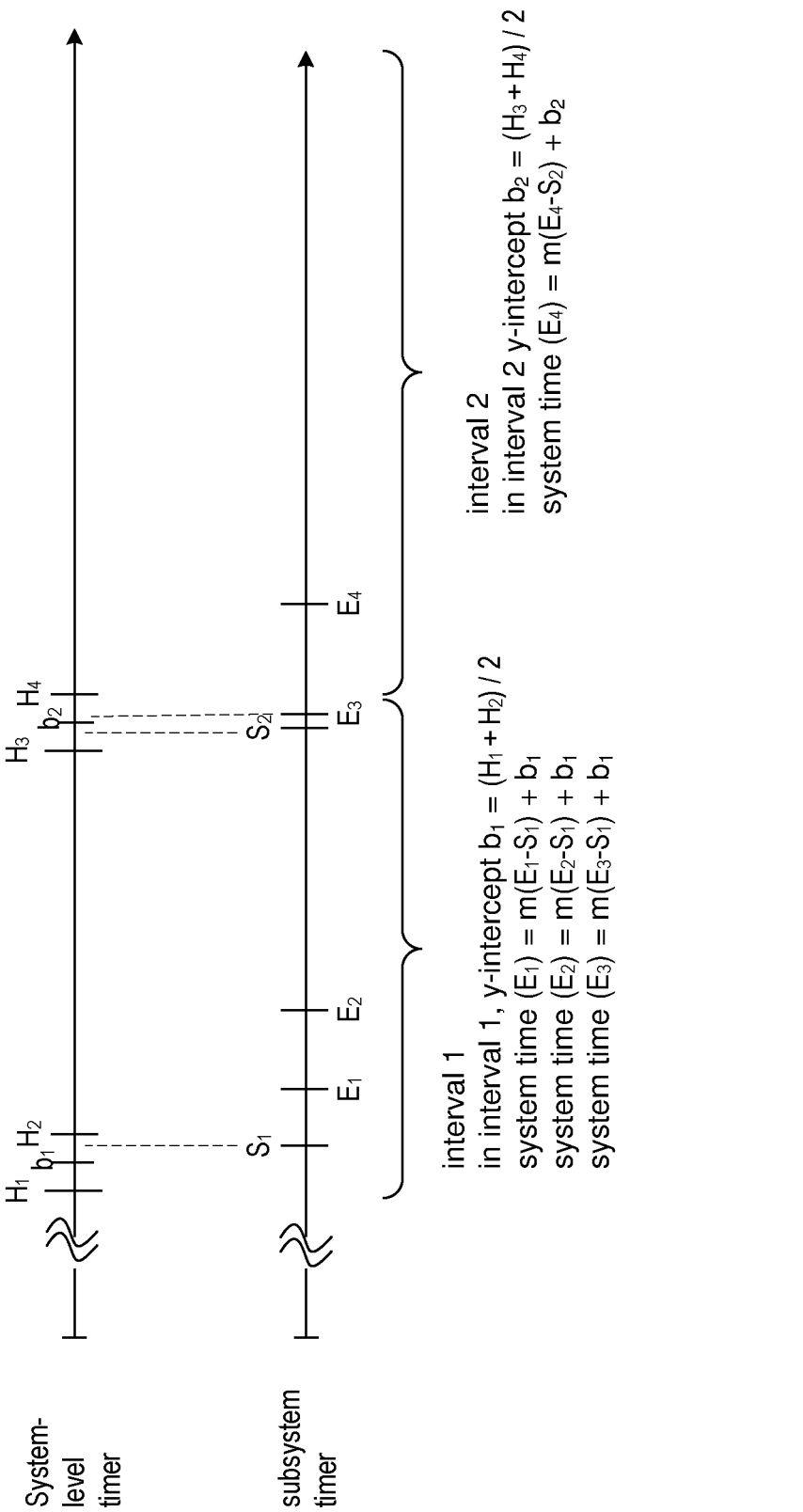
FIG. 4 shows timelines associated with a system-level timer and a subsystem timer.

FIG. 4 shows timelines associated with a system-level timer and a subsystem timer. Though host sampling of only one subsystem timer and the timelines of the system-level timer and that one subsystem timer are shown, it will be recognized that in a system having multiple subsystems, the host would similarly sample the timers of the other subsystems in order to synchronize the timestamps of traced events from those subsystems.

According to the disclosed approaches, the host processor samples a system-level timer and samples the timer of each desired subsystem, and there is an inherent delay (the "system-subsystem delay") from the time the host processor reads the system-level timer and the time that the subsystem timer samples its timer. One approach (FIG. 4) is directed to an implementation in which the amount of system-subsystem delay is unknown, and another approach (FIG. 5) is directed to an implementation in which the system-subsystem delay is "known" (or generally predetermined from prior testing or simulations and used as a static amount in the debug run).

The example of FIG. 4 shows the host processor synchronizing timestamps of subsystem events to the system-level timer twice. The timestamps (or "times") of the samples of the system-level timer are labeled $H_1$, $H_2$, $H_3$, and $H_4$, and the timestamps of the samples of the subsystem timer are labeled $S_1$ and $S_2$. The timestamps of traced subsystem events are shown as $E_1$, $E_2$, $E_3$, and $E_4$. The synchronization of timestamps can be performed from time-to-time, periodically, or responsive to selected timer synchronization events. Examples of timer synchronization events can include, starting a timer, stopping a timer, resetting a timer, or changing the clock frequency of a clock domain. Note that if no drifting or shifting (e.g., resetting, clock throttling) occurs of the clocks, then multiple synchronizations may not be required.

In the example of FIG. 4, a host processor estimates the system-subsystem delay by first sampling the system-level timer, then sampling the subsystem timer, and in response to receiving the sample from the subsystem, sampling the system-level timer a second time. At time $H_1$, the host processor samples the system-level timer. After sampling the host-level timer, the host processor sends a message to the subsystem to sample the subsystem timer. The subsystem timer is sampled at time $S_1$, and the timestamp is returned to the host processor. In response to receiving the subsystem timestamp, which can also be denoted $S_1$, at time $H_2$ the host samples the system-level timer a second time. The mean of the $H_1$ and $H_2$ ($b_1=(H_1+H_2)/2$) is an offset from the base time of the system-level timer, and is an estimate of the system-level time at which the subsystem timer was sampled.

The preceding approach for determining the offset assumes that the communication time in obtaining the subsystem timer is split evenly between the transmission of the request for the timestamp from the host system to the subsystem and the transmission of the timestamp from the subsystem to the host system. In an alternative approach, the offset can be based the system having been characterized to determine a ratio of the host-to-subsystem communication delay to the subsystem-to-host communication delay. For example, if the host-to-subsystem communication delay is determined to be greater than the subsystem-to-host communication delay, the offset as a function of $H_1$ and $H_2$ could be $b_1=0.4*H_1+0.6*H_2$.

The offset, which is a function of first and second host timestamps as described above, is the y-intercept used in a slope-intercept translation of subsystem timestamps to system-level times. The slope (m) is the ratio of the system-level clock frequency to the subsystem clock frequency. In the example, a traced event occurs at time $E_1$ as illustrated on the subsystem timeline. The subsystem time $E_1$ is equivalent to the system-level time, $y=m$ $(E_1-S_1)+b_1$. Similarly, the subsystem time $E_2$ is equivalent to the system-level time, $y=m$ $(E_2-S_1)+b_1$. In an alternative implementation, the absolute timestamp values of the events can be used for the "x" term instead of relative values. That is, the subsystem time $E_1$ is equivalent to the system-level time, $y=m*E_1+b_1$, and the subsystem time $E_2$ is equivalent to the system-level time, $y=m*E_2+b_1$.

The example shows that events are traced in parallel with the host processor sampling the timers. The disclosed approaches reduce the system time needed gather traced event data because there is no need to stop the application while sampling the timers. That is, the application can continue to run and events can be traced while the timers are sampled. For example, the subsystem event traced at time $E_3$, occurs while the host processor is performing the second synchronization. That is, the host processor has sampled the system-level timer at time $H_3$ but has not received the subsystem timestamp $S_2$ to trigger sampling of the system-level timer at time $H_4$. The offset $b_1$ and prior subsystem timestamp $S_1$ are used until the timestamp $H_4$ is available to complete the synchronization. Thus, the subsystem time $E_3$ is equivalent to the system-level time, $y=m$ $(E_3-S_1)+b_1$.

Once the host processor has sampled the timers to obtain $H_3$, $S_2$, and $H_4$, a new offset can be computed as $b_2=(H_3+H_4)/2$, and $b_2$ and $S_2$ can be used to translate subsystem timestamps to equivalent system-level times.

The example of FIG. 4 shows the host processor synchronizing the timer of one subsystem as an example. The disclosed approaches can be applied to use cases involving the host processor synchronizing the timestamps from multiple subsystems in multiple clock domains. In those scenarios, the host processor would individually sample the timer of each subsystem in the same manner shown in FIG. 4. The resynchronization timestamps of the subsystems need not coincide and can vary, such as in response to different reset times.

Figure 5:
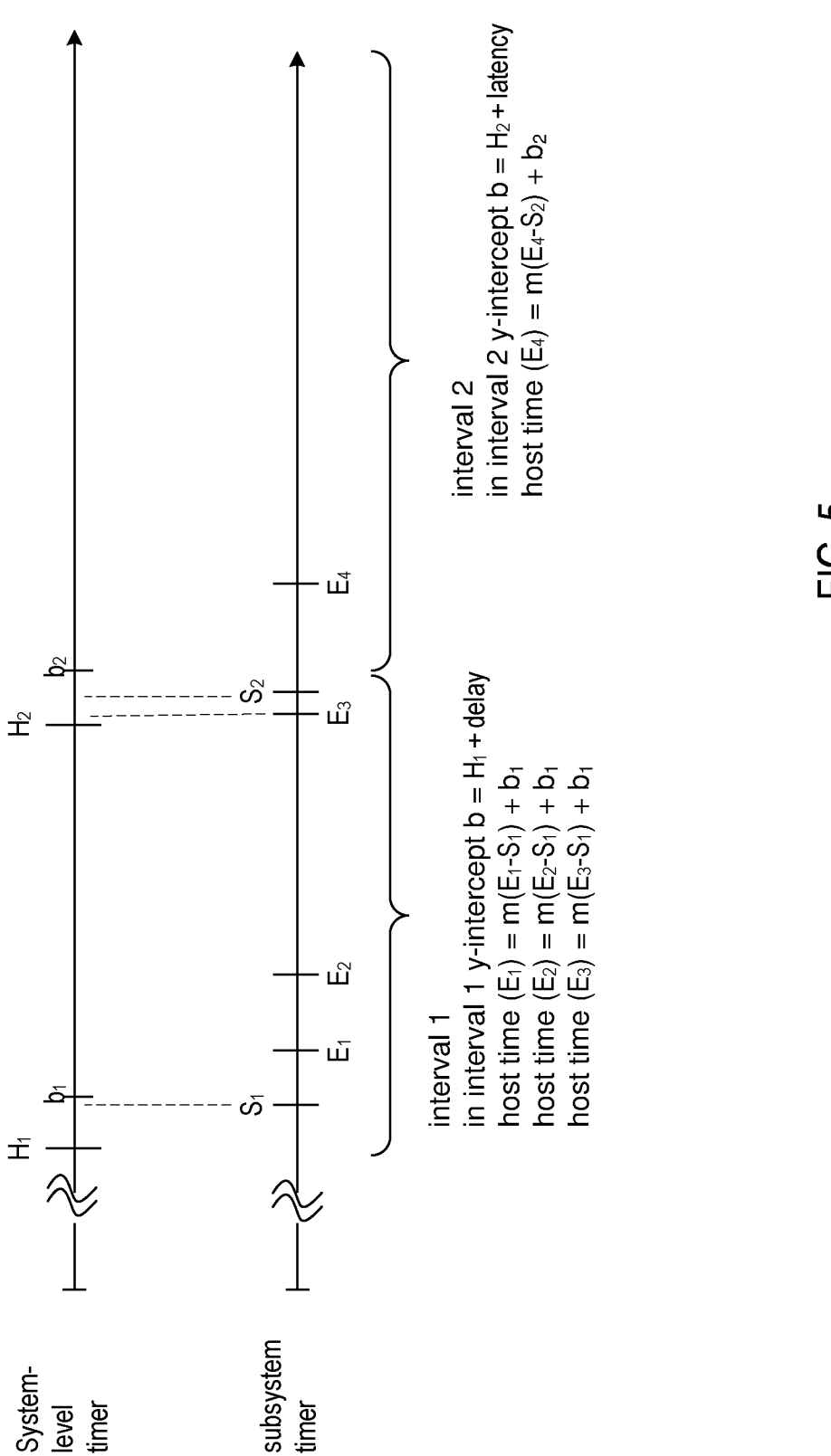
FIG. 5 shows timelines associated with a system-level timer and a subsystem timer in an implementation in which the system-subsystem delay is known.

FIG. 5 shows timelines associated with a system-level timer and a subsystem timer in an implementation in which the system-subsystem delay is known. In this implementation, only one sample of the system-level timer is needed to establish the offset. The offset is the sum of the system-level timestamp and the known amount of system-subsystem delay. The corresponding sample of the subsystem timer is used in calculating the x-term in the slope intercept equation.

The example of FIG. 5 shows the host processor synchronizing timestamps of subsystem events to the system-level timer twice. The timestamps of the samples of the system-level timer are labeled $H_1$ and $H_2$, and the corresponding timestamps of the samples of the subsystem timer are labeled $S_1$ and $S_2$. The timestamps of traced subsystem events are shown as $E_1$, $E_2$, $E_3$, and $E_4$. The synchronization of timestamps can be performed from time-to-time, periodically, or responsive to selected timer synchronization events. Examples of timer synchronization events can include, starting a timer, stopping a timer, resetting a timer, or changing the clock frequency of a clock domain. Note that if no drifting or shifting (e.g., resetting, clock throttling) occurs of the clocks, then multiple synchronizations may not be required.

At time $H_1$, the host processor samples the system-level timer. After sampling the host-level timer, the host processor sends a message to the subsystem to sample the subsystem timer. The subsystem timer is sampled at time $S_1$, and the timestamp is returned to the host processor.

The y-intercept (or "offset") used in a slope-intercept translation of subsystem timestamps to system-level times is $b_1=H_1+D$, where D is the known amount of system-subsystem delay. In the example, event 1 is traced at time $E_1$ as illustrated on the subsystem timeline. The subsystem time $E_1$ is equivalent to the system-level time, $y=m \ (E_1-S_1)+b_1$. Similarly, the subsystem time $E_2$ is equivalent to the system-level time, $y=m \ (E_2-S_1)+b_1$. In an alternative implementation, the absolute timestamp values of the events can be used for the "x" term instead of relative values. That is, the subsystem time $E_1$ is equivalent to the system-level time, $y=m*E_1+b_1$, and the subsystem time $E_2$ is equivalent to the system-level time, $y=m*E_2+b_1$.

The example shows that events are traced in parallel with the host processor sampling the timers. The subsystem event traced at time $E_3$, occurs while the host processor is performing the second synchronization. That is, the host processor has sampled the system-level timer at time $H_3$ but has not received the subsystem timestamp $S_2$. The offset $b_1$ and prior subsystem timestamp $S_1$ are used until the timestamp $S_2$ is received to complete the synchronization. Thus, the subsystem time $E_3$ is equivalent to the system-level time, $y=m \ (E_3-S_1)+b_1$.

Once the host processor has sampled the subsystem timer to obtain $S_2$, a new offset can be computed as $b_2=H_2+D$ and $b_2$ and $S_2$ can be used to translate subsystem timestamps to equivalent system-level times.

The example of FIG. 5 shows the host processor synchronizing the timer of one subsystem as an example. The disclosed approaches can be applied to scenarios involving the host processor synchronizing the timestamps from multiple subsystems in multiple clock domains. In those scenarios, the host processor would individually sample the timer of each subsystem in the same manner shown in FIG. 5. The resynchronization timestamps of the subsystems need not coincide and can vary, such in response to different reset times.

Figure 6:
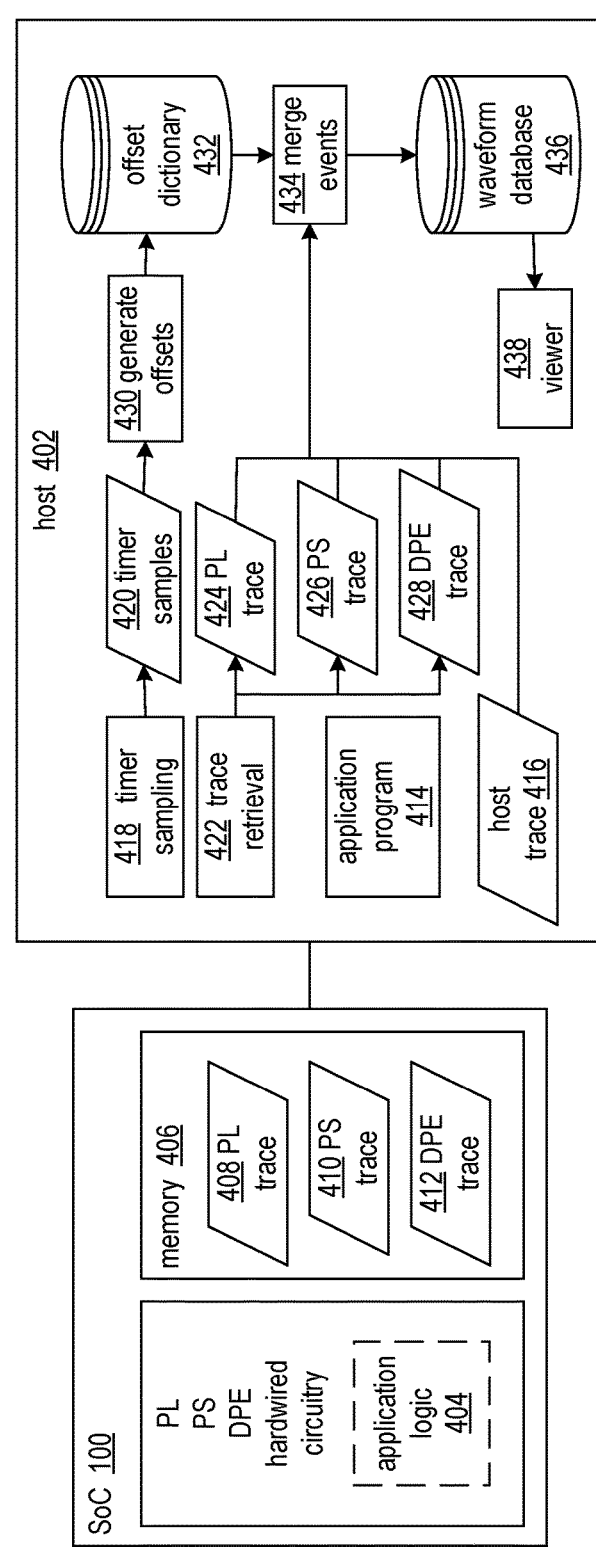
FIG. 6 shows a system having subsystems configured to operate with different clock domains according to an application.

FIG. 6 shows a system having subsystems configured to operate within different clock domains according to an application. The system is also configured to capture traced event data and render the traced event data according to a system-level timeline. The exemplary system includes an SoC 100 and a host data processing system 402. The SoC 100 corresponds to the architecture of the SoC of FIG. 1, for purposes of illustration. The PL, PS, DPE, and hardwired subsystems (FIG. 1, 104, 106, 102, 110) are configured to implement application logic 404.

One or more of the PL, PS, DPE, and hardwired subsystems can be configured to trace events by detecting events and storing event data in memory circuitry 406 according to known approaches. The memory circuitry can be on-device or off-device, depending on the SoC architecture. The subsystems write the traced event data to separate areas of the memory, which is shown as PL trace 408, PS trace 410, and DPE trace 412.

The host data processing system 402 can be communicatively coupled to the SoC 100 via recognized interfaces, such as wide area networks, local area networks, memory buses, and/or boundary scan interfaces. Depending on the application, a portion can be implemented as application program 414 that is executable on the host. Events of the host and application program can be traced and stored as host trace 416 in storage (e.g., RAM or non-volatile storage) of the host data processing system. The application program can also be considered a subsystem. Though if the timer of the host data processing system is used for the system-level timeline, the timestamps of application program event data in the host trace 416 would be timestamps from the host timer, and no translation would be necessary.

The host data processing system 402 can be configured to execute debug tool programs that perform functions such as configuring the subsystems to trace events, turning-on event tracing, initiating a run of the application, and preparing traced event data as disclosed herein.

The debug tools include timer sampling logic 418 that samples timers for synchronizing timestamps in trace event data to a system-level timer. The timer sampling logic samples a system-level timer, such as a real-time clock of the host data processing system or another timer considered to be the system-level timer, and subsystem timers. The timer sampling logic can use the AXI4-Lite protocol to access the timers of the subsystems. Other protocols such as AXI-Full/PCIE/Serial may also be suitable, depending on the subsystems and system architecture. In one example, a DPE tile has a timer, and the timer is mapped to a memory address. From the perspective of the host data processing system, the DPE tile is reading from DPE memory. The AXI request uses an address channel to reference the timer within the DPE tile, and the DPE tile sends back the timer value on the data channel.

According to the disclosed approaches, the timer sampling logic samples the timers in parallel with the tracing/storing of event data in the SoC memory. According to an exemplary system, the timestamps returned from the subsystem timers to the timer sampling logic are quantified as current cycle counts from startup or reset. The timer sampling logic stores the sampled timestamps as timer samples 420 in host memory or host storage. The timer sampling logic stores an identifier of a subsystem in association with the sampled subsystem timestamp and corresponding system-level timestamp(s).

The debug tools include trace retrieval logic 422 that transfers the traced event data from SoC memory circuitry to host memory or host storage via recognized input/output channels. The trace retrieval logic can retrieve the traced event data from the SoC at the end of a run of the application or periodically. The retrieved trace data is written to separate files in host memory or storage and is shown as PL trace 424, PS trace 426, and DPE trace 428.

The debug tools include generate offsets logic 430. The generate offsets logic creates an offset dictionary 432 in host memory or non-volatile storage from the timer samples 420. The offsets can be calculated as described above. The offset dictionary indicates for each subsystem an offset value, a subsystem identifier, and an interval of the system-level timeline over which the associated offset is applicable for the subsystem.

The debug tools include merge events logic 434. The merge events logic translates event timestamps to a system-level timeline and consolidates the traced event data into a waveform database 436. The process translates subsystem timestamps, for example, cycle counts, into system-level times using the offset dictionary. The event data is ordered by the system-level timestamps, and the waveform database entries indicate the start time and stop time of each event and identify the subsystem in which the event occurred.

The debug tools can include viewer logic 438. The viewer can read event data from the waveform database and display the event data along a system-level timeline.

Figure 7:
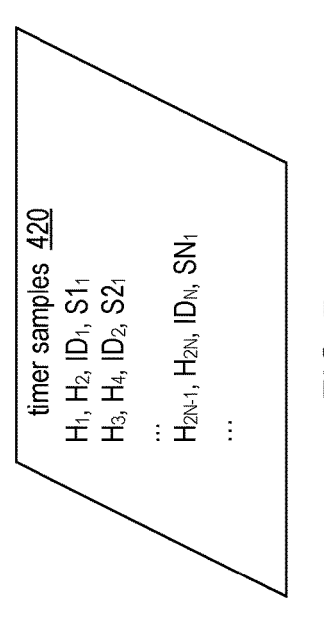
FIG. 7 shows an example of timestamp samples read from a system timer and from the timers of N subsystems.

FIG. 7 shows an example of sampled timestamps read from a system timer and from the timers of N subsystems. The example corresponds to an implementation in which the system-subsystem delays are unknown (e.g., FIG. 4). Identifiers of N subsystems are denoted $ID_k$, where $1 \le k \le N$. Timestamps of the system-level timer are denoted as $H_i$, and samples of the subsystem timers are denoted $Sk_j$, where i is the number of the sample read from the system-level timer, and j is the number of the sample read from subsystem k. Each set of sampled timestamps includes a pair of system-level timestamps, a subsystem identifier, and a corresponding subsystem timestamp. For example, the set of sampled timestamps that can be used to compute the offset for subsystem $ID_2$, includes $H_3$, $H_4$, and $S2_1$.

The example of FIG. 7 shows sets of timestamp samples for computing the offsets for the subsystems over one time interval of the running application. The timer samples 420 can include additional sets of timestamp samples to cover scenarios in which the offsets can change while the application is running.

In an implementation in which the system-subsystem delay is known, each set of sampled timestamps need not include the second system-level timestamp. Each set would include a system-level timestamp, a subsystem identifier, and a corresponding subsystem timestamp.

Figure 8:
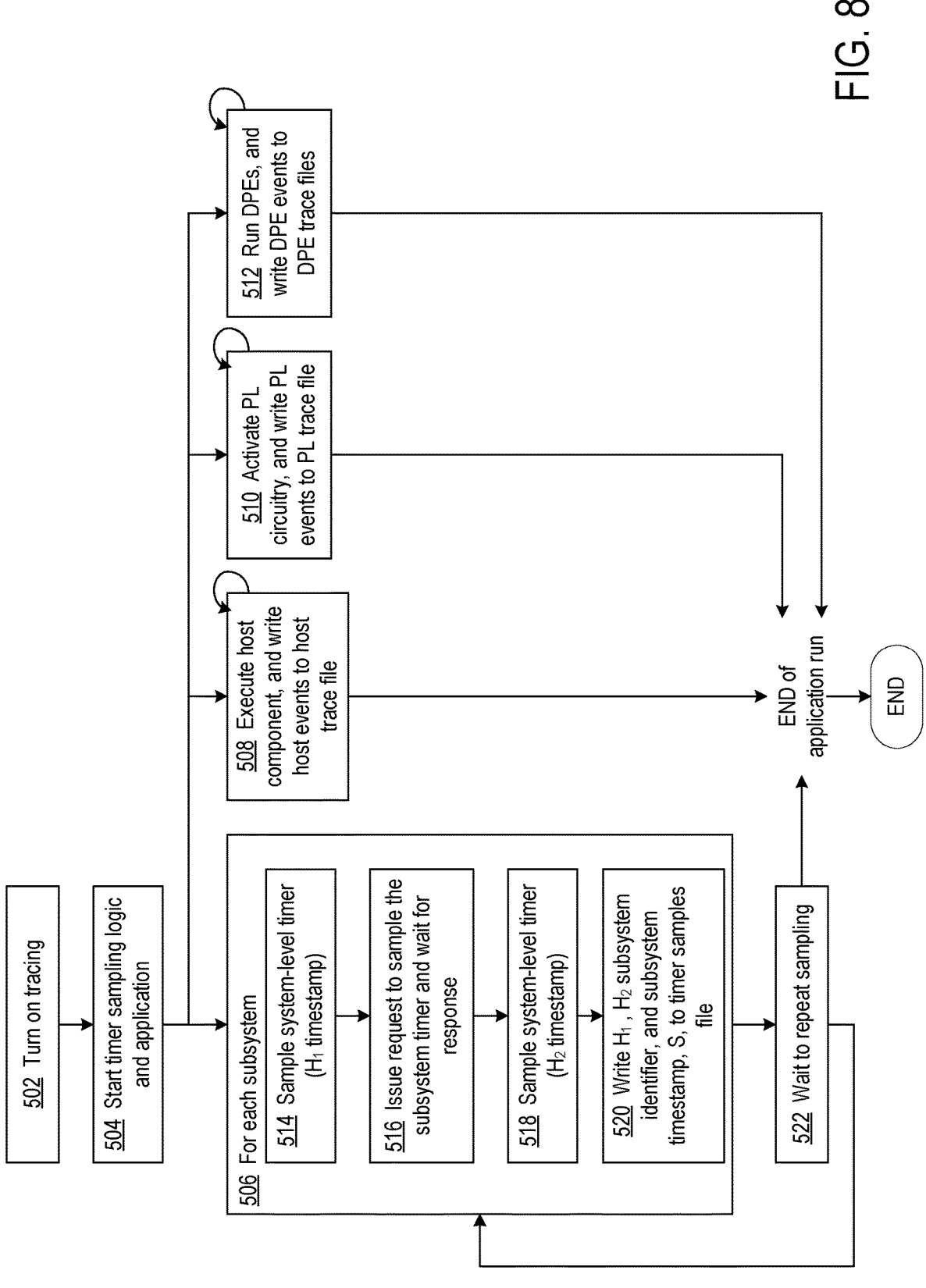
FIG. 8 shows a flowchart of a process for sampling system and subsystem timers while tracing event data associated with the subsystems.

FIG. 8 shows a flowchart of a process for sampling system and subsystem timers while tracing event data associated with the subsystems. At block 502, a user can input to a debugging tool a parameter that turns on event tracing, and at block 504 the debug tool can start the timer sampling logic (FIG. 7, 418) and the subsystems of the application.

Block 506 shows the process of the timer sampling logic. The timer sampling logic samples the subsystem timers, and the operations (blocks 514, 516, 518, and 520) of the timer sampling logic are performed in parallel with the tracing of subsystem events in blocks 508, 510, and 512.

At block 508, the host application subsystem commences execution, and instrumentation/debug code linked to the application detects events and writes event data to the host trace file. The timestamps in the host application event data can be real times (e.g., stopwatch) generated by the timer of the host data processing system.

At block 510, the PL subsystem(s) commences operation, and debug logic linked to the PL subsystems detects events and writes event data to memory circuitry (FIG. 6, 406) of the SoC. The timestamps in the PL event data can be, for example, cycle counts of a clock signal or a real-time, depending on architecture and capabilities of the debug tool and SoC.

At block 512, the DPEs commence operation, and debug logic linked to the DPEs detects events and writes event data to memory circuitry (FIG. 6, 406) of the SoC. The timestamps in the DPE event data can be cycle counts of a clock signal, for example.

Blocks 514, 516, 518, and 520 show the operations performed by the timer sampling logic for sampling the system-level timer and the timer of each subsystem. The process illustrates the exemplary implementation in which the system-subsystem delay is unknown (see FIG. 4). At block 514, the timer sampling logic samples the system-level timer, which provides a timestamp, $H_1$.

At block 516, the timer sampling logic sends a request to debugging support circuitry, or similarly known SoC circuitry, of the subsystem to sample the subsystem timer. The timer sampling logic waits for the debugging support circuitry to sample the subsystem timer and for receipt of the timestamp ("S").

At block 518, in response to receiving the timestamp of the subsystem, the timer sampling logic samples the system-level timer a second time, resulting in timestamp $H_2$. In an implementation in which the system-subsystem delay is known (FIG. 5), the second sampling of the system-level timer need not be performed. The timer sampling logic writes $H_1$, $H_2$, the identifier of the subsystem, and S to a timer samples file (FIG. 4, 420) at block 520.

The sampling of the timers shown by block 506 can be repeated based on debugging requirements, as shown by block 522. For example, the sampling can be repeated periodically to address clock signal drift and/or repeated in response to a system or subsystem reset.

Figure 9:
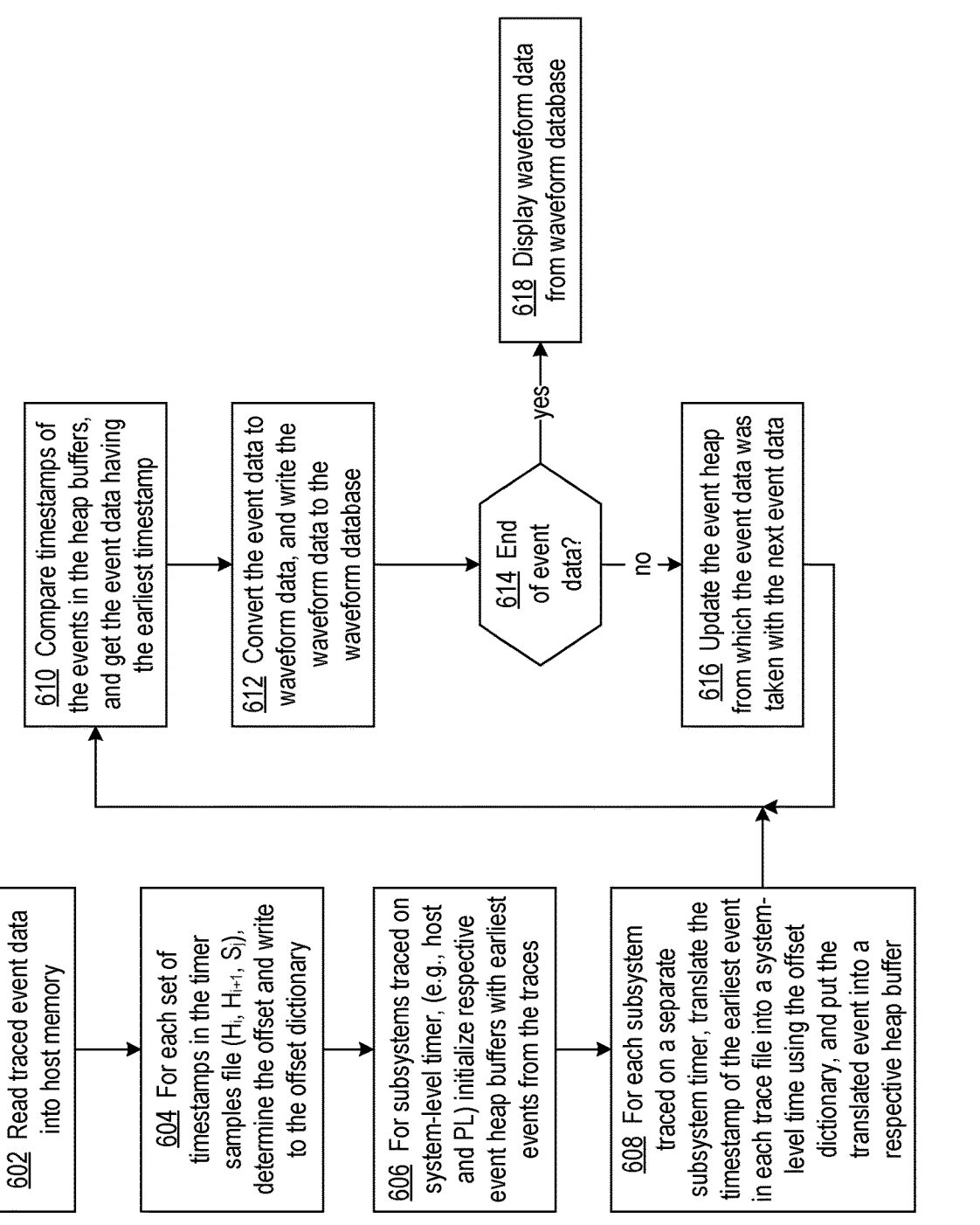
FIG. 9 shows a flowchart of a process for translating traced event data to a system-level timeline.

FIG. 9 shows a flowchart of a process for translating traced event data to a system-level timeline. The translation can be performed as the application is running or after completing a run. At block 602, the debugging tool reads traced event data from SoC memory circuitry and writes the event data of the different subsystems in separate trace files in host storage.

At block 604, for each set of timestamps in the timer samples file (FIG. 6, 420), the generate offsets logic determines an offset value and writes the offset value, subsystem timestamp, S, and associated subsystem identifier to the offset dictionary (FIG. 6, 432). In an implementation in which the system-subsystem delay is unknown, the offset associated with a subsystem is calculated as $(H_i+H_{i+1})/2$, where $H_i$ and $H_{i+1}$ are the timestamps of the system-level timer sampled immediately before and after sampling the subsystem timer. In an implementation in which the system-subsystem delay ("D") is known, the offset associated with a subsystem is calculated as $H_i+D$.

For subsystems having events traced and timestamped by the system-level timer, at block 606 the merge events logic initializes respective heap buffers associated with those subsystems with the event data having earliest timestamp in the trace file. Examples of subsystems having events traced and timestamped by the system-level timer can include the host application and PL subsystems.

At block 608, for each subsystem having events traced and timestamped by a subsystem timer, the merge events logic translates the earliest subsystem timestamp in the trace file to a system-level timestamp. In translating the timestamp, the merge events logic obtains the offset value associated with the subsystem from the offset dictionary. The system-level timestamp is calculated as y=mx+b, where m is a ratio of a clock frequency of the system timer to a clock frequency of the subsystem timer, x is a difference between the timestamp in the traced event data and the associated subsystem timestamp, S, from the offset file, and b is the respective offset value from the offset file.

At block 610, the merge events logic compares the timestamps of the events in the event heap buffers at block 610, and selects the event data having the earliest timestamp. The selected event data is converted to waveform data and written to the waveform database by the merge events logic at block 612. The waveform data can be time-ordered in the waveform database using a B-tree data structure for example. Retrieving data from this database is significantly faster compared to a flat text file. Moreover, the file size of a waveform database remains small due to its compressed binary format.

In response to any of the trace files having more event data, decision block 614 directs the merge events logic to block 616. At block 616, the merge events logic updates the heap logic from which the event data was selected with event data from the corresponding trace file (if there is more event data in that trace file). For a trace file having event data timestamped by the system-level timer, the event trace data can be copied to the heap buffer and removed from the trace file. For a trace file having event data timestamped by a subsystem timer, the timestamp is translated as described above for block 608.

At block 618, viewer logic of the debugger tool can be invoked to display the event data according to a system-level timeline.

Figure 10:
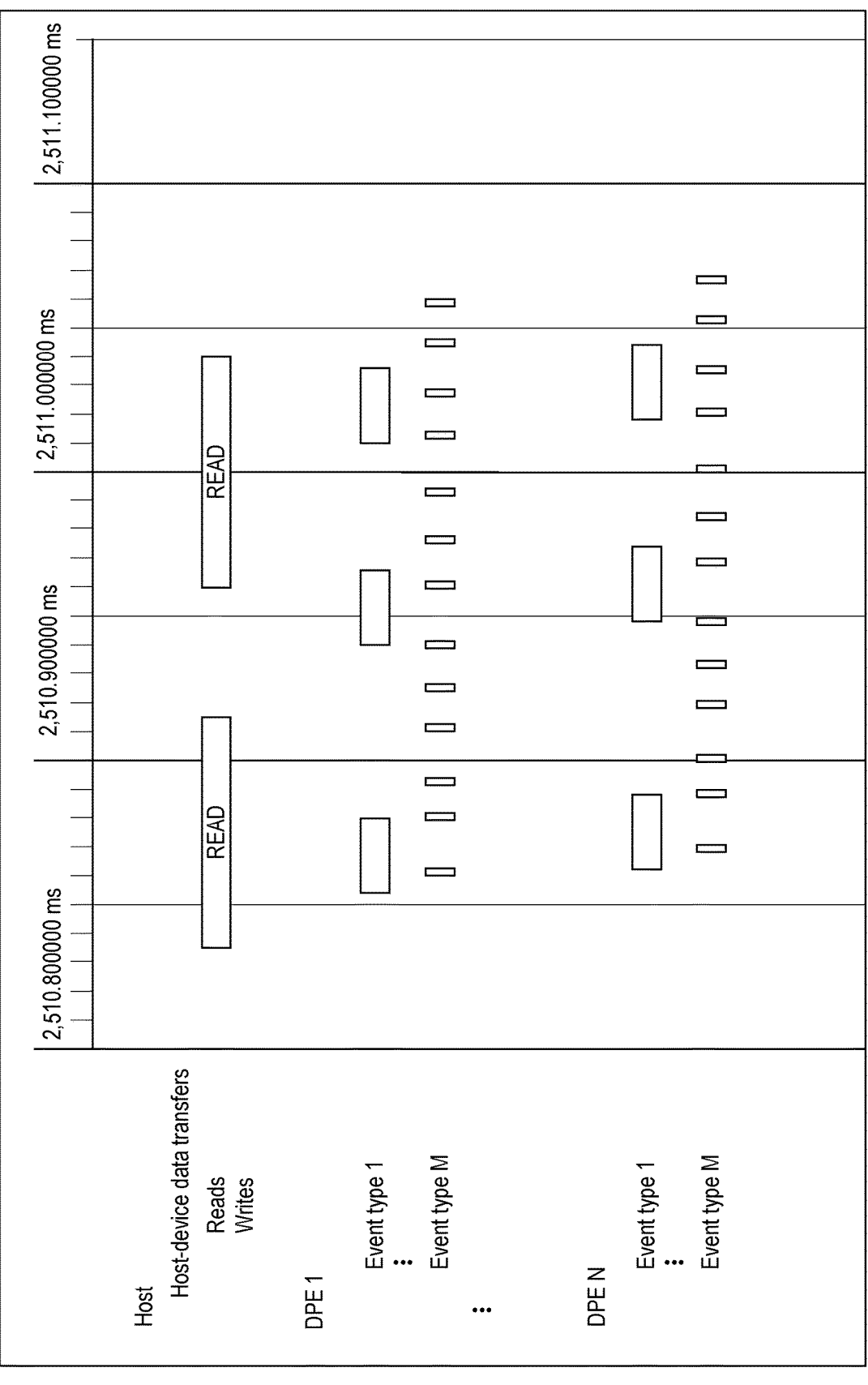
FIG. 10 shows an example of a waveform display according to a system-level timeline, of traced event data from a host application, N DPEs, and PL subsystems.

FIG. 10 shows an example of a waveform display according to a system-level timeline, of traced event data from a host application, N DPEs, and PL subsystems. The unit of measurement of the exemplary system-level timeline is a millisecond. Events are illustrated by rectangles horizontally aligned with labels that describe the events. The vertical alignment of a rectangle with the system-level time scale indicates the start time and end time of the labelled event.

Figure 11:
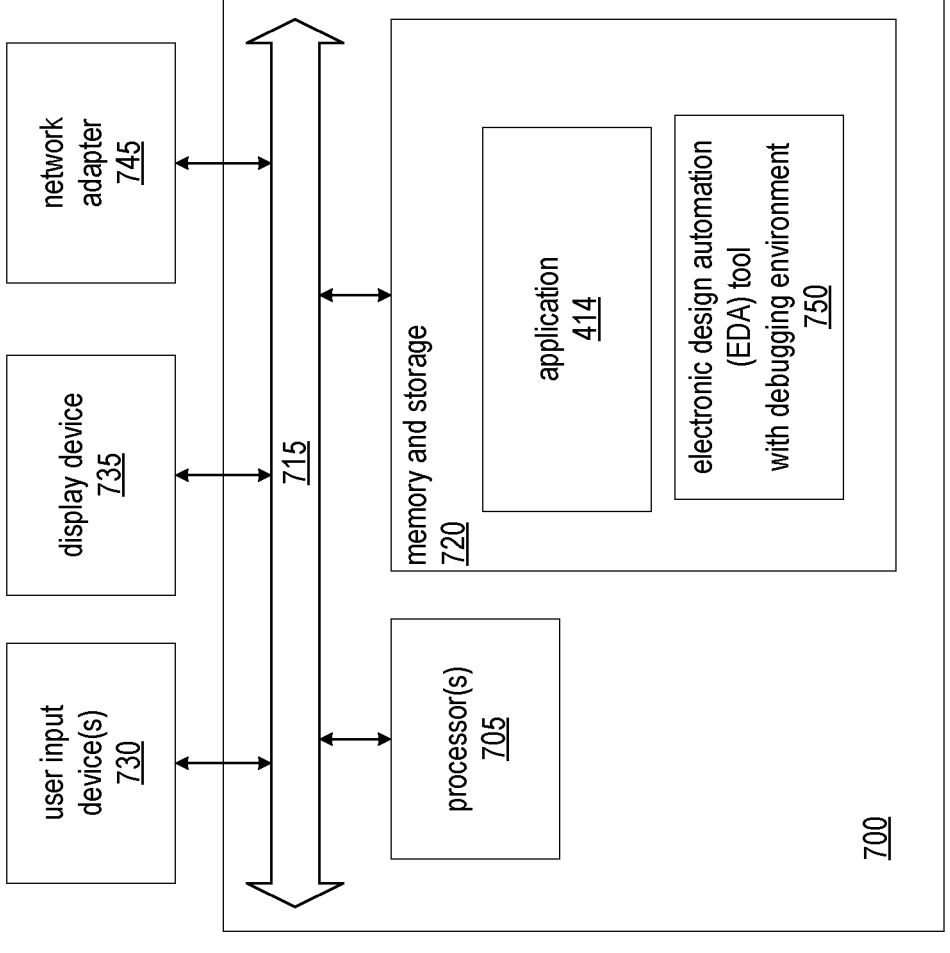
FIG. 11 is a block diagram illustrating an exemplary data processing system.

FIG. 11 is a block diagram illustrating an exemplary data processing system (system) 700. System 700 includes at least one processor circuit (or "processor"), e.g., a central processing unit (CPU) 705 coupled to memory and storage arrangement 720 through a system bus 715 or other suitable circuitry. System 700 stores application program code 414 and EDA tool 750 within memory and storage arrangement 720. CPU 705 executes the program code accessed from the memory and storage arrangement 720 via system bus 715. In one aspect, system 700 is implemented as a computer or other data processing system that is suitable for storing and/or executing program code. It should be appreciated, however, that system 700 can be implemented in the form of any system including a processor and memory that is capable of performing the functions described within this disclosure.

Memory and storage arrangement 720 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 700 may also include one or more cache memories (not shown) that provide temporary storage of at least some program code and data in order to reduce the number of times program code and data must be retrieved from local memory and persistent storage during execution.

Input/output (I/O) devices such as user input device(s) 730 and a display device 735 may be optionally coupled to system 700. The I/O devices may be coupled to system 700 either directly or through intervening I/O controllers. A network adapter 745 also can be coupled to system 700 in order to couple system 700 to other systems, computer systems, remote printers, and/or remote storage devices through intervening private or public networks. Modems, cable modems, Ethernet cards, and wireless transceivers are examples of different types of network adapter 745 that can be used with system 700.

Memory and storage arrangement 720 may store an EDA application 750 and a host application 414. EDA application 750, being implemented in the form of executable program code, is executed by CPU 705. As such, EDA application 750 is considered part of system 700. System 700, which is configured as a debugger tool while executing EDA application 750, receives and operates on the traced event data as described herein.

EDA tool 750, application 414, and any data items used, generated, and/or operated upon by EDA application 750 are functional data structures that impart functionality when employed as part of system 700 or when such elements, including derivations and/or modifications thereof, are loaded into an IC such as a programmable IC causing implementation and/or configuration of a circuit design within the programmable IC.

Various logic may be implemented as circuitry to carry out one or more of the operations and activities described herein and/or shown in the figures. In these contexts, a circuit or circuitry may be referred to using terms such as "logic," "module," "engine," "generator," or "block." It should be understood that elements labeled by these terms are all circuits that carry out one or more of the operations/activities. In certain implementations, a programmable circuit is one or more computer circuits programmed to execute a set (or sets) of instructions stored in a ROM or RAM and/or operate according to configuration data stored in a configuration memory.

Though aspects and features may in some cases be described in individual figures, it will be appreciated that features from one figure can be combined with features of another figure even though the combination is not explicitly shown or explicitly described as a combination.

The methods and systems are thought to be applicable to a variety of systems for debugging subsystems operating in different clock domains. Other aspects and features will be apparent to those skilled in the art from consideration of the specification. The methods and systems may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method, comprising:

translating timestamps of traced event data from a clock domain of a first subsystem to a clock domain of a host processor, comprising, by the host processor:

sampling a system clock of the host processor to provide a first timestamp of the system clock;

sending a message to the first subsystem to instruct the first subsystem to sample a clock of the first subsystem to obtain a timestamp of the clock of the first subsystem, subsequent to the sampling the system clock;

computing a first offset for the first subsystem based on the first timestamp of the system clock and a delay between a time at which the host processor samples the system clock to provide the first timestamp, and a time at which the first subsystem samples the clock of the first subsystem; and translating a timestamps of the traced event data of the first subsystem to a timeline of the system clock, comprising, computing a first slope-intercept based on a ratio of a frequency of the system clock to a frequency of the clock of the first subsystem, a difference between the timestamp of the traced event data and the first timestamp of the system clock, and the first offset.

2. The method of claim 1, further comprising performing the translating as the first subsystem performs event tracing, without interrupting the event tracing.

3. The method of claim 1, wherein:

the computing the first slope-intercept comprises computing mx+b;

m is a ratio of a frequency of the system clock to a frequency of the clock of the first subsystem;

x is a difference between the timestamp of the traced event data and the first timestamp; and b is the first offset.

4. The method of claim 1, wherein the translating further comprises, by the host processor:

sampling the system clock to provide a second timestamp of the system clock, subsequent to receiving the timestamp of the clock of the first subsystem; and computing the delay as a mean of the first and second timestamps of the system clock.

5. The method of claim 1, wherein the translating further comprises, by the host processor:

computing a ratio of host-to-subsystem communication delay to a subsystem-to-host communication delay based on characterization data of the clock domains of the host and the first subsystem; and computing the delay based on the ratio.

6. The method of claim 1, further comprising:

translating timestamps of traced event data from a clock domain of a second subsystem to the clock domain of the host processor, comprising, by the host processor:

sending a message to the second subsystem to instruct the second subsystem to sample a clock of the second subsystem to provide a timestamp of the second subsystem, subsequent to the sampling the system clock;

computing a second offset for the second subsystem based on the first timestamp and a delay between the time at which the host processor samples the system clock to provide the first timestamp, and a time at which the second subsystem samples the clock of the second subsystem; and translating a timestamp of the traced event data of the second subsystem to the timeline of the system clock, comprising, computing a second slope-intercept based on a ratio of the frequency of the system clock to a frequency of the clock of the second subsystem, a difference between the timestamp of the traced event data of the second subsystem and the first timestamp, and the second offset.

7. The method of claim 6, further comprising:

merging the traced event data of the first and second subsystems into a merged file in which corresponding event data is ordered according to the timeline of the system clock.

8. The method of claim 7, further comprising, by the host processor:

displaying the traced event data from the merged file according to the timeline of the system clock.

9. The method of claim 1, wherein:

the sampling comprises periodically sampling the system clock to provide multiple first timestamps of the system clock; and the sending comprises sending the message to the first subsystem subsequent to each of the periodic samplings of the system clock to obtain multiple corresponding timestamps of the clock of the first subsystem; and the translating a timestamp of the traced event data comprises translating multiple timestamps of the traced event data to the timeline of the system clock based on the multiple first timestamps of the system clock and the multiple corresponding timestamps of the clock of the first subsystem.

10. A system comprising:

a host processor;

memory comprising instructions that, when executed by the host processor, cause the host processor to translate the timestamps of traced event data from a clock domain of a first subsystem to a clock domain of the host processor, including to:

sample a system clock of the host processor to obtain a first timestamp of the system clock;

send a message to the first subsystem to instruct the first subsystem to sample a clock of the first subsystem to obtain a timestamp of clock of the first subsystem, subsequent to sampling the system clock;

compute a first offset for the first subsystem based on the first timestamp of the system clock and a delay between a time at which the host processor samples the system clock to provide the first timestamp of the system clock, and a time at which the first subsystem samples the clock of the first subsystem; and translate a timestamp of the traced event data of the first subsystem to a timeline of the system clock, including to compute a first slope-intercept based on a ratio of a frequency of the system clock to a frequency of the clock of the first subsystem, a difference between the timestamp of the traced event data and the first timestamp of the system clock, and the first offset.

11. The system of claim 10, wherein the instructions further cause the host processor to translate the timestamp of the traced event data as the first subsystem performs event tracing, without interrupting the event.

12. The system of claim 10, wherein the instructions further cause the host processor to:

sample the system clock to provide a second timestamp of the system clock, subsequent to receiving the timestamp of the clock of the first subsystem; and compute the delay as a mean of the first and second timestamps of the system clock.

13. The system of claim 12, wherein the instructions further cause the host processor to:

compute the first slope-intercept as mx+b, wherein:

m is a ratio of a frequency of the system clock to a frequency of the clock of the first subsystem;

x is a difference between the timestamp of the traced event data and the first timestamp; and b is the first offset.

14. The system of claim 10, wherein the instructions further cause the host processor to:

compute a ratio of host-to-subsystem communication delay to a subsystem-to-host communication delay based on characterization data of the clock domains of the host and the first subsystem; and compute the delay based on the ratio.

15. The system of claim 10, wherein the instructions further cause the host processor to:

translate timestamps of traced event data from a clock domain of a second subsystem to the clock domain of the host processor, including to:

send a message to the second subsystem to instruct the second subsystem to sample a clock of the second subsystem to provide a timestamp of the second subsystem, subsequent to the sampling the system clock;

compute a second offset for the second subsystem based on the first timestamp and a delay between the time at which the host processor samples the system clock to provide the first timestamp, and a time at which the second subsystem samples the clock of the second subsystem; and translate a timestamp of the traced event data of the second subsystem to the timeline of the system clock, comprising, computing a second slope-intercept based on a ratio of the frequency of the system clock to a frequency of the clock of the second subsystem, a difference between the timestamp of the traced event data of the second subsystem and the first timestamp, and the second offset.

16. The system of claim 15, wherein: the instructions further cause the host processor to:

merge the traced event data of the first and second subsystems into a merged file in which corresponding event data is ordered according to the timeline of the system clock.

17. The system of claim 16, wherein the instructions further cause the host processor to:

display the event data from the merged file according to the timeline of a system timer.

18. The system of claim 10, wherein the instructions further cause the host processor to:

periodically sample the system clock; and send the message to the first subsystem subsequent to each periodic sample of the system clock to obtain multiple corresponding timestamps of the clock of the first subsystem; and translate multiple timestamps of the traced event data to the timeline of the system clock based on the multiple timestamps of the system clock and the multiple corresponding timestamps of clock of the first subsystem.

* * * * *